Figure 1:
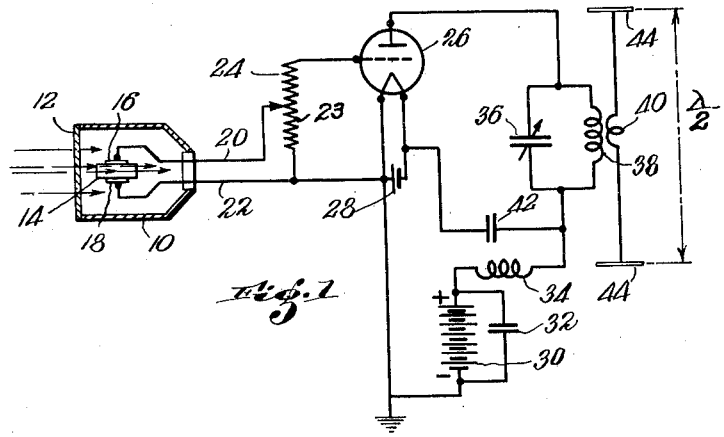

March 14, 1950     C. SPAETH     2,500,473

ULTRA HIGH FREQUENCY RADIATION COUNTER

Filed June 26, 1948

INVENTOR.
Charles Spaeth
BY
Kenway, Jenney, Witter & Hildreth
Attys

Patented Mar. 14, 1950

2,500,473

UNITED STATES PATENT OFFICE 2,500,473

ULTRA HIGH FREQUENCY RADIATION COUNTER

Charles Spaeth, Mamaroneck, N. Y.

Application June 26, 1948, Serial No. 35,332

13 Claims. (Cl. 250—83.3)

This invention relates to radiation counters and, more particularly, to a new principle ultra high-frequency radiation counter of precision and accuracy.

The principal object of this invention is to produce a more efficient radiation counter of high precision and accuracy capable of consistent reproducible results.

Another object of this invention is to produce an efficient radiation counter which in conjunction with an associated radiant energy transmitter, may be utilized to transmit from considerable distances the measurement, detection or counting of radiations which may be ultra high-frequency in character.

A still further object of this invention is to produce an efficient and accurate radiation counter in association with electronic circuits which may be widely used in various branches of research and industry. A particular application in industry may include the accurate measurement of the thickness of metals and other materials in metallurgy.

Another object of this invention is to provide a radiation counter associated with an efficient simple electron tube amplifier circuit requiring a minimum of components and considerably lower operating potentials. This desirable feature permits the construction of a compact lightweight portable radiation counter of ultimate precision and accuracy.

The problem of making radiation counters into instruments of precision and of causing them to count quantitatively and accurately and to yield reproducible results has been the basic factor confronting the research and development of radiation counters such as is well known in the art. The art of record involves a large number of contributions by research, and the problems pertaining to the construction and operation of these devices are well known.

In general, counters of the sort heretofore employed include a tube having an ionizable gas content, and a pair of electrodes at high potential. When radiations penetrate the tube and ionize the gas, a conductive path is established between the electrodes, and the output of the tube reflects the density of the radiation as a function of ionization. Such counters are subject to two variable factors which militate against accuracy and repeatability. In the first place the amount of ionization obtained from a given density of radiation is subject to variation due to various effects including variations in atmospheric conditions. In the second place, similar factors vary the response of the circuit elements to a given amount of ionization of the gas.

The most important feature of my invention resides in a combination of circuit elements effective to eliminate the second of the two variable factors discussed above. Within a tube containing an ionizable gas I mount a crystal of fixed frequency characteristics connected to circuit elements effective to maintain the crystal on the threshold of excitation in the absence of an ionized atmosphere in the tube. When the gas is ionized, even slightly, the crystal oscillates at its natural frequency. The most important advantage of my arrangement flows from the fact that the response of the crystal to a given amount of radiation-induced ionization is constant and unvarying. Therefore the accuracy of an instrument constructed in accordance with my invention is much greater than has heretofore been obtained.

Another important advantage resulting from the circuit of my invention is the fact that my novel counter is much more sensitive in its response than counters of the Geiger-Mueller type commonly employed. The amount of ionization required to excite the crystal is much less than that required to render the conventional tube conductive.

Moreover, the crystal employed in my counter may advantageously serve a double function. That is to say, in addition to its function as a detector of radiation, it may be included as the crystal element of a radio frequency transmitter used to detect radiation at remote localities or as a means of obtaining radiation data at high altitudes from balloons, rockets, or the like.

At the present time, counters are widely used in various branches of research and industry. In research, such devices usually serve to detect and record the number of particles emitted in various experiments involved in the study of nuclear radiation, disintegration and transmutation. These instruments are virtually indispensable in interpreting the data obtained by cyclotrons and Van de Graaff generators in that they enable the number of particles in a given beam, or the numbers produced in a given reaction to be determined with accuracy. Counters are also used in ascertaining whether a bombardment has given rise to a radioactive product, and to determine the nature, the intensity, and the period of the resulting activity. Similarly, they may be used to establish the identity and amount of naturally radioactive material or artificially activated substances. Neutron counters can be built to detect preferentially either fast or slow neutrons, and can therefore be used to measure the intensity of the neutron source, the number of neutrons in any given experimental arrangement, or the number diffusing out, from some apparatus into the surrounding room.

Figure 2:
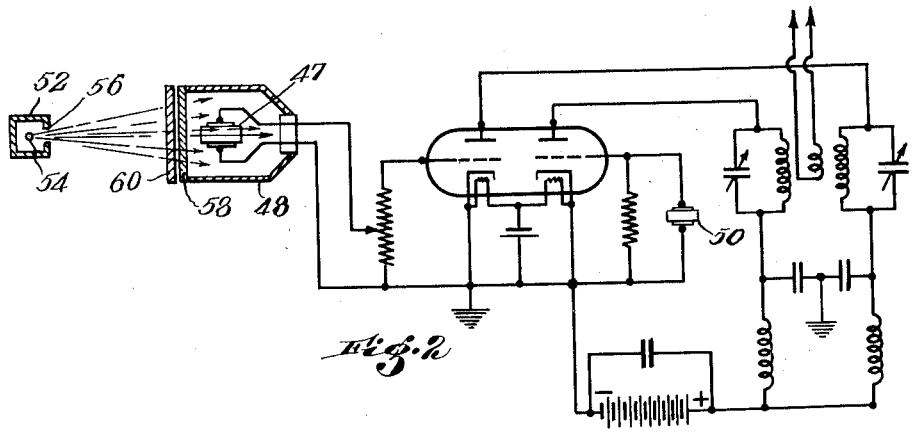
Figure 3:
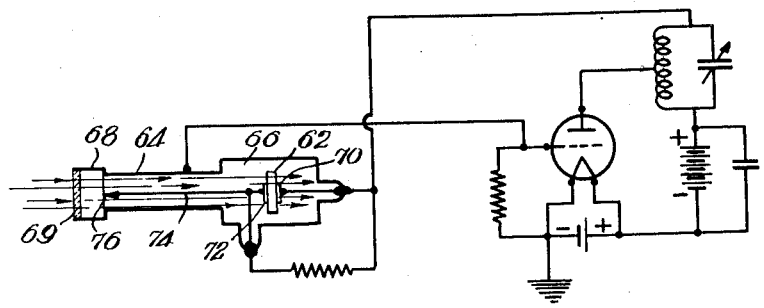

These and other objects and advantages of my invention will be more readily understood and appreciated from the following description of radiation counters embodying my invention and its associated electronic circuits as illustrated and explained in the accompanying drawings, in which:

Fig. 1 is a diagrammatic view of a counter constructed in accordance with my invention, and Figs. 2 and 3 are diagrammatic views of other embodiments of the invention.

The counter is organized about a vacuumtight tube or envelope 10 formed of a suitable material relatively resistant to radiation and having at one end a window 12 of glass, copper or other material less resistant thereto. By "radiation" I mean to include every type capable of producing ionization of a confined gas, for example X-rays, alpha, beta, or gamma rays, fast or slow neutrons, cosmic rays, etc. Those skilled in the art will readily understand how to construct a tube for detection of any given type of radiation.

Mounted within the tube 10 is a piezo-electric crystal 14 of quartz, tourmaline, Rochelle salts, or other conventional material responding to electric potentials at a resonant frequency. As is customary, the crystal 14 is arranged between a pair of metal plates or conductive metallic surfaces 16 and 18 attached to the crystal surfaces and soldered to a pair of lead wires 20 and 22 which are sealed in the base of the tube 10 and emerge therefrom as tube terminals connected across a potentiometer 24 included in the grid circuit of a triode 26 operating as an oscillator of conventional design. The oscillator is powered by a B battery 30 and an A battery 28 and includes an R. F. choke 34, a pair of conventional by-pass condensers 32 and 42 and a tank circuit comprising a variable condenser 36 across an inductance 38. The connections are those of an ordinary grid-plate oscillator. A coil 40 inductively coupled to the tank circuit feeds a half wave dipole antenna by means of which radio frequency waves are transmitted in conventional fashion. In other words the crystal 14 serves as the control element of a radio frequency transmitter as well as the responsive element of a radiation counter.

The voltage of the B battery 30 may be as low as 22½ volts, or even of lower potential, since my novel counter does not require the high operating potentials characteristic of Geiger-Mueller instruments.

When the device shown in Fig. 1 is to be operated, the potentiometer 24 is adjusted until the oscillator circuit functions, the condenser 36 being tuned to match the resonant frequency of the tank circuit to that of the crystal. Then the potentiometer is manipulated to reduce the voltage across the crystal to such a degree that the crystals no longer will oscillate but is on the threshold of excitation.

Within the tube 10 is a mixture of gases, an easily ionized gas and a gas having the property of quenching ionization. For example the easily ionized gas may be monatomic or diatomic; monatomic gases include argon, neon, helium, krypton, and xenon; diatomic gases include hydrogen and nitrogen. For the quenching gas I employ a polyatomic gas such as chlorine, iodine, or bromine.

When radiations enter the tube 10 the gaseous content thereof is ionized and the impedance across the crystal is thereby lowered so that the crystal oscillates. This effect appears to be implemented by the penetration of its radiation through the body of the crystal itself. An equivalent concept is that of shunting the crystal by a low resistance. The antenna will radiate bursts of energy of an amplitude and duration responsive to the density of radiation received in the tube 10. The repetition rate of the bursts will also reflect the density of the received radiation. The effect of ionization may be considered the equivalent of introducing into the circuit a self-adjusting grid leak resistor of a value related directly to the intensity of the exciting radiation.

The natural frequency of the crystal may be at any selected value between a few kilocycles and about 50 megacycles. Furthermore the circuit may operate either at the crystal frequency or any harmonic thereof. The tube may be constructed for activation not only by nuclear particle radiation but for ultra-violet infra-red, or visible light.

The dipole antenna system may be replaced by any other suitable detecting or recording means well known in the art, such as a galvanometer, loud speaker, sensitive meter, or cathode ray oscilloscope. This radiation counter apparatus may be made into extremely lightweight, compact and portable equipment requiring minimum operating potentials as the source of current supply. The extremely high potentials usually necessary with many of the Geiger-Mueller types of radiation counter tubes are therefore not essentially necessary with my novel crystal radiation counter tube. The accuracy and consistency of radiation counter tube performance due to its integral crystal construction permits performance at extremely accurate and increased sensitivity. This type of radiation counter tube is extremely simple, dependable and can be readily duplicated with tubes of similar construction having identical characteristics. For this reason this new and improved type of construction lends itself to the manufacture of radiation counter tubes having identically similar characteristics. Another advantage that is inherent with my type of radiation counter tube as compared with a Geiger-Mueller type of tube is that the Geiger-Mueller type of tube requires a high gain, high voltage amplifier for detection, whereas my new type of radiation counter tube may use a low gain, low voltage amplifier for detection, thereby saving considerable space, weight, and cost of providing for high voltage potential sources of supply. Also, the sensitivity of my type of radiation counter tube is extremely sensitive due to its particular crystal structure and may be utilized to detect extremely feeble radiations which otherwise may not be detected at all by other known types of radiation counters.

In Fig. 2 a circuit diagram is illustrated showing the use of my new type radiation counter tube in association with a twin triode type of oscillator circuit designed to produce a beat frequency resulting as the difference between the natural frequency of the crystal mounted within the radiation counter tube and another crystal completing the input circuit of the opposite portion of the twin triode oscillator and its associated plate tank circuits. Assuming, for example, that the crystal 41 mounted as an integral part of a radiation counter tube 48 has a natural frequency of 6000 kilocycles and that external crystal 50 has a natural frequency of 6002 kilocycles the resultant beat frequency produced in the plate tank circuits would be the equivalent of the difference between the natural frequencies of the two crystals or a beat frequency of 2 kilocycles. It may be very desirable to produce a beat frequency in this manner since a beat frequency of approximately 2 kilocycles has maximum sensitivity within the range of human audibility. Of course, in a similar manner, as in Fig. 1, the output of the oscillators may be coupled to any conventional indicating or recording device.

Ionization of the gaseous atmosphere in the crystal radiation counter tube of Fig. 2 takes place only when radiations penetrate the window 58 of this tube and ceases when the radiations discontinue or fail to exist, since this type of radiation counter tube with its internal crystal is, as has been explained previously, maintained by the adjustable resistor 24 just at the threshold of excitation and consequent ionization of the gaseous atmosphere of the tube. The adjustment of the resistor 24 may also be so arranged so that the crystal in the radiation counter tube oscillates. The radio frequency potential generated by the crystal across its own terminals are sufficient to ionize the gaseous atmosphere within the radiation counter tube in this instance.

In Fig. 2 a fixed external source of radiations of predetermined intensity is illustrated as a lead chamber containing a small quantity of radium 54 which will radiate emanations through an aperture 56 in close proximity to the window 58 of the radiation counter tube 1. In close proximity to the window 58 may be placed any substance or object, for example, such as sheet steel, which is to be measured as to thickness or other metallurgic characteristics. The sheet of metal is illustrated in Fig. 2 as the sheet 60 in close proximity to the window 58 of the radiation counter tube. This is to explain one of the commercial or industrial applications, particularly that of thickness measurement of any substances, to which this type of radiation counter tube and associated circuits may be employed.

In Fig. 3 the radiation counter tube is shown as having a still further improved construction as compared to the radiation counter tubes shown in schematic form in Fig. 1 and Fig. 2. The electron tube oscillator circuit used in association therewith is shown as having a grid input circuit and a tuned plate circuit and suitable operating potential sources of current supply.

In normal operation the D. C. plate supply voltage is adjusted by means of a tapped tank coil or other suitable means in the plate circuit of the electron tube oscillator to such a value that the gaseous atmosphere of the radiation counter tube is slightly below or at the threshold of ionization. A crystal 62 mounted within the radiation counter tube may be simultaneously established in an oscillating state or may be placed in a state of either constant excitation or on the threshold of oscillation.

In this instance the counter tube includes a long metal barrel 64 terminating at one end in an enlarged chamber 66 in which the crystal 62 is mounted. At its other end the barrel terminates in a cup-shaped chamber 68 carrying a window 69 through which radiations may enter the tube. The crystal 62 is provided with a pair of electrode plates 70 and 72, and a long rod or wire 74 mounted on the plate 72 terminates at the end of the barrel 64 in a sharpened point 76. As before, the oscillator circuit is conventional.

In the case of operation where the crystal 62 is maintained in a state of continuous oscillation the tube functions as a self-quenching radiation counter tube. Assuming that the crystal 62 has a natural frequency of 6000 kilocycles, when in an oscillatory state it vibrates at its own natural frequency and the surface of the crystal radiates supersonic sound waves of 6000 kilocycles into the gaseous column in the barrel 64, which are conducted along the entire length of the electrode wire 74 to the sharpened point 76, and this electrode wire will de-ionize the gas previously ionized by the oscillating crystal 62. The de-ionization due to supersonic waves in a gaseous medium occurs as the result of gas pressure gradients along the wire 74 which carries the supersonic waves from the surface of the crystal. The pressure gradients act to drive ions away from the region of the wire to regions of lower pressure. Inasmuch as the pressure is highest next to the wire and lowest near the wall 64 there is set up within the container gas diffusion and convection currents similar to a gas jet. The constant removal of the ions near the electrodes results in rapid de-ionization. When a crystal vibrates in a gaseous medium a current of gas is produced, the so-called "quartz wind." The currents are formed by the vibration of the quartz surface, first acting to push gas away from the crystal surface but not completely pulling it back in the reverse stroke; hence gas will stream in from the sides to the low pressure region thus produced. At the next forward vibration of the quartz the new gas volume is likewise pushed away, thus producing phases of compression and expansion in the gase column along the axis of the wire and next to the crystal surfaces. Consequently ions are in effect blown away at high velocity from the electrodes as the result of the supersonic sound waves radiated from the electrodes at the crystal end along the wire 74, the net result being rapid de-ionization at the region of the crystal. The electrode wire 74, with the sharpened point on the end thereof, is utilized to establish a potential gradient on its extreme terminus with a value as high as possible to facilitate ionization of the gaseous atmosphere of the radiation counter tube at the lowest possible potential necessary to cause ionization besides acting as a conductor, also for the conduction of supersonics and transferring them to the gaseous atmosphere. In other words, the wire 74 supported on one surface of the crystal 62 serves greatly to increase the sensitivity of the radiation counter tube to extremely feeble radiations, and to be responsive to detection of said feeble radiations with the lowest possible operating and ionizing potentials.

The tank circuit in the plate circuit of the electron tube will also continuously radiate at radio frequency at the natural frequency of the crystal of the radiation counter tube, or as has been previously explained in Fig. 1, may be tuned to a higher harmonic, if found desirable.

The plate tank circuit can be tuned if desired to higher harmonics, and the output of this circuit may be coupled or connected to additional frequency multipliers so that it can modulate a Klystron tube in radar equipment.

With the crystal 62 in a state of continuous oscillation, it is preferred that it be adjusted in an oscillatory state so that the gaseous atmosphere in the radiation counter tube is in itself directly ionized thereby from said oscillating crystal solely. However, when radiations penetrate the window 69 of this tube, the impedance between the wire 74 and the surrounding barrel 64 of the radiation counter tube is decreased due to increased cumulative ionization, thereby causing an increase in the radio frequency grid voltage and a corresponding increased plate voltage in the electron oscillator tube. A stronger power output in the plate circuit therefore results, which can be realized in a greater output to the indicating means, whichever form may be found desirable to use, and which may be coupled to the plate tank circuit.

On the other hand, if the crystal 62 mounted within the radiation counter tube, is not maintained in a constant oscillatory state but established just at the threshold of excitation and the gas also is established at the threshold of ionization, the radiation counter tube of Fig. 3 may be used to detect extremely feeble radiations not easily detected even in the sensitive radiation counter tubes of Fig. 1 and Fig. 2. This is due to the extremely increased sensitivity of the radiation counter tube of Fig. 3, in that it has a larger exposed electrode area than the radiation counter tubes of Fig. 1 and Fig. 2. In the radiation counter tube of Fig. 3 the wire 74 with sharpened point 76 on the end thereof serves as the anode, and the metallic cylinder 64 of the radiation counter tube serves as the cathode.

Those skilled in the art will readily appreciate that the circuits associated with the crystals shown in the drawings are conventional and require no description. For pulsed micro wave work the tube with the crystal may advantageously be connected in a super-regenerative circuit. Many other oscillator circuits may be employed in conjunction with amplifiers, electronic pulse counters, and the like.

Having thus disclosed my invention embodying a radiation counter tube having an ocillatory crystal mounted within a gaseous atmosphere, and having described three electron tube oscillatory circuits as embodiments thereof, which may be applicable to any of the various detection functions described herein, but without intending to limit my invention to the specific details of either the constructions or the circuits shown, I claim and desire to secure by Letters Patent:

1. A radiation-responsive device comprising an envelope having a window permeable by radiation, an ionizable gas contained by said envelope, a crystal mounted within said envelope, and an electric circuit including said crystal and means to maintain said crystal on the threshold of excitation in the absence of radiation effective to ionize said gas.

2. A radiation-responsive device comprising an envelope having a portion permeable by radiation, an ionizable gas contained in said envelope, a crystal mounted in said envelope, an oscillator circuit including said crystal and means to maintain said crystal on the threshold of excitation in the absence of radiation effective to ionize said gas.

3. A radiation-responsive device comprising a tube having a window permeable by radiation, an ionizable gas contained in said tube, a crystal mounted within said tube, and a radio frequency oscillator circuit including said crystal as a frequency control element.

4. A radiation-responsive device comprising a tube, an ionizable gas contained in said tube, a crystal mounted in said tube, and an oscillator circuit including said crystal and responsive to the density of radiations operating to ionize the gas in the tube.

5. A radiation responsive device comprising walls forming a chamber, said walls having one portion more permeable by radiation than other portions, an ionizable gas filling said chamber, a piezo-electric crystal mounted in said chamber and an oscillator circuit connected to said crystal and responsive to the resistance across said crystal.

6. A radiation responsive device comprising a tube, an ionizable gas contained in said tube, a piezo-electric crystal mounted in said tube, an electronic oscillator circuit including said crystal as a frequency determining element and having a tank circuit tuned to the resonant frequency of the crystal, and a radio frequency radiating device coupled to said circuit.

7. A radiation responsive device comprising walls forming an enclosure, an ionizable gas contained in said enclosure, a piezo-electric crystal mounted in said enclosure, an oscillator circuit including said crystal as a frequency determining element and capable of being tuned to the resonant frequency of the crystal, a source of potential connected to said crystal, and means for varying the potential across the crystal until the crystal is at the threshold of excitation.

8. A radiation responsive device comprising an envelope having a window permeable to radiation, an ionizable medium within said envelope, a crystal disposed within said medium, a high frequency circuit operatively associated with said crystal, and means to maintain said crystal in a non-oscillating condition.

9. A radiation responsive device comprising an envelope having a window permeable to radiation, an ionizable medium within said envelope, a crystal disposed within said medium, a high frequency circuit operatively associated with said crystal, and means to maintain said crystal in an oscillating condition.

10. A radiation responsive device comprising an envelope having a window permeable to radiation, an ionizable medium within said envelope, a crystal disposed within said medium, a high frequency circuit operatively associated with said crystal, and means to maintain said crystal on the threshold of oscillations and said ionizable medium on the threshold of ionization.

11. A radiation responsive device comprising an envelope permeable to radiation, an ionizable medium contained in said envelope, a piezo-electric crystal disposed in said medium, and means including an electrical circuit for maintaining said crystal in an oscillating state, the said crystal being further included in said circuit as a frequency determining element, whereby said crystal will generate pressure waves in said ionizable medium at supersonic frequencies and thereby cause electron-ion density changes in said medium at the frequency of the crystal.

12. A radiation responsive device comprising an envelope permeable to radiation, an ionizable medium contained in said envelope, a piezo-electric crystal disposed in said medium, means including an electrical circuit for maintaining said crystal in an oscillating state, and a radiating rod coupled to said crystal being further included in said circuit as a frequency determining element, whereby said crystal will generate pressure waves in said ionizable medium and along said rod at supersonic frequencies and thereby cause electron-ion density changes in said medium at the frequency of the crystal.

13. A radiation responsive device comprising an envelope, an ionizable medium within said envelope, a crystal disposed in said medium, means including an electrical circuit for placing said crystal in oscillating condition, whereby said crystal will radiate into said medium periodic pressure and ion-electron distribution waves at the frequency of the crystal, said crystal also being included in said circuit as the frequency determining element thereof.

CHARLES SPAETH.

REFERENCES CITED

The following references are of record in the file of this patent:

UNITED STATES PATENTS

| Number | Name | Date |
|---|---|---|
| 2,278,936 | Lindsay et al. | Apr. 7, 1942 |